(12) United States Patent
Sethi et al.

(10) Patent No.: US 11,711,804 B2
(45) Date of Patent: Jul. 25, 2023

(54) UPLINK MULTI-USER SOUNDING FOR WLAN

(71) Applicant: NXP USA, Inc., Austin, TX (US)

(72) Inventors: Ankit Sethi, Pune (IN); Sudhir Srinivasa, Los Gatos, CA (US); Sayak Roy, Kolkata (IN); B Hari Ram, Chennai (IN)

(73) Assignee: NXP USA, Inc., Austin, TX (US)

( * ) Notice: Subject to any disclaimer, the term of this patent is extended or adjusted under 35 U.S.C. 154(b) by 880 days.

(21) Appl. No.: 16/551,948

(22) Filed: Aug. 27, 2019

(65) Prior Publication Data

US 2020/0084786 A1 Mar. 12, 2020

Related U.S. Application Data

(60) Provisional application No. 62/728,667, filed on Sep. 7, 2018.

(51) Int. Cl.
| | |
|---|---|
| *H04W 72/1273* | (2023.01) |
| *H04W 74/00* | (2009.01) |
| *H04W 16/28* | (2009.01) |
| *H04L 25/02* | (2006.01) |

(Continued)

(52) U.S. Cl.
CPC ..... *H04W 72/1273* (2013.01); *H04L 25/0224* (2013.01); *H04W 16/28* (2013.01); *H04W 74/004* (2013.01); *H04W 84/12* (2013.01); *H04W 88/08* (2013.01)

(58) Field of Classification Search
CPC ............. H04W 72/1273; H04W 16/28; H04W 74/004; H04W 84/12; H04W 88/08; H04L 25/0224; H04B 7/0452; H04B 7/0617; H04B 7/0408; H04B 7/0626; H04B 7/0663
See application file for complete search history.

(56) References Cited

U.S. PATENT DOCUMENTS

| | | | |
|---|---|---|---|
| 8,774,725 B1 | 7/2014 | Nabar et al. | |
| 8,878,724 B1 | 11/2014 | Nabar et al. | |
| 9,319,904 B1 * | 4/2016 | Srinivasa | ................ H04L 43/12 |

(Continued)

OTHER PUBLICATIONS

European Application # 19195543.4 search report dated Nov. 28, 2019.

(Continued)

*Primary Examiner* — Abdullahi Ahmed (57) ABSTRACT

A WLAN AP includes an array of antennas, a transceiver and a processor. The transceiver is configured to transmit via the array of antennas downlink packets to WLAN STAs, and to receive uplink packets from the STAs. The processor is coupled to the transceiver and is configured to send a request to a plurality of the STAs to transmit a respective plurality of channel-sounding packets corresponding to the plurality of STAs, to receive the plurality of channel-sounding packets from the plurality of STAs in response to the request, to compute, based on the received plurality of channel-sounding packets, a beamforming matrix that defines subsequent transmission beams aimed toward at least a subset of the plurality of STAs, and to transmit one or more downlink data packets to one or more of the STAs via the array of antennas, in accordance with the beamforming matrix.

16 Claims, 2 Drawing Sheets

(51) Int. Cl.
*H04W 88/08* (2009.01)
*H04W 84/12* (2009.01)

(56) References Cited

U.S. PATENT DOCUMENTS

| | | |
|---|---|---|
| 9,444,577 B1 | 9/2016 | Zhang et al. |
| 9,910,129 B1 | 3/2018 | Srinivasa et al. |
| 10,178,673 B1* | 1/2019 | Jiang .................. H04L 5/0051 |
| 10,439,695 B1 | 10/2019 | Zhang et al. |
| 2010/0046457 A1* | 2/2010 | Abraham ............ H04B 7/0408 |
| | | 370/329 |
| 2010/0254473 A1 | 10/2010 | Wu et al. |
| 2011/0135023 A1 | 6/2011 | Kwon et al. |
| 2012/0051287 A1* | 3/2012 | Merlin ............ H04L 25/03343 |
| | | 370/328 |
| 2017/0093600 A1* | 3/2017 | Li ....................... H04L 25/0224 |
| 2017/0265212 A1* | 9/2017 | Zhang ................. H04W 72/042 |
| 2018/0070330 A1* | 3/2018 | Chu .................... H04W 74/002 |
| 2018/0343044 A1 | 11/2018 | Athley et al. |

OTHER PUBLICATIONS

P802.11ax/D3.3 draft standard "Draft Standard for Information technology; Telecommunications and information exchange between systems Local and metropolitanarea networks; Specific requirements; Part 11: Wireless LAN Medium Access Control (MAC) and Physical Layer (PHY) Specifications; Amendment 1: Enhancements for High Efficiency WLAN", pp. 1-730, Dec. 2018.

* cited by examiner

UPLINK MULTI-USER SOUNDING FOR WLAN

CROSS-REFERENCE TO RELATED APPLICATIONS

This application claims the benefit of U.S. Provisional Patent Application 62/728,667, filed Sep. 7, 2018, whose disclosure is incorporated herein by reference.

FIELD OF THE DISCLOSURE

The present disclosure relates generally to Wireless Local-Area Networks (WLAN), and particularly to methods and systems for uplink sounding in WLAN.

BACKGROUND

Various communication systems use beamforming techniques for directional transmission and reception. Beamforming techniques for Wireless Local-Area Networks (WLANs) are specified, for example, in the IEEE P802.11ax™/D3.3 draft standard, entitled "Draft Standard for Information technology; Telecommunications and information exchange between systems Local and metropolitan area networks; Specific requirements; Part 11: Wireless LAN Medium Access Control (MAC) and Physical Layer (PHY) Specifications; Amendment 1: Enhancements for High Efficiency WLAN," December, 2018, which is incorporated herein by reference. This standard is also referred to herein as "IEEE 802.11ax" for brevity.

The description above is presented as a general overview of related art in this field and should not be construed as an admission that any of the information it contains constitutes prior art against the present patent application.

SUMMARY

An embodiment that is described herein provides a Wireless Local-Area Network (WLAN) Access Point (AP) including an array of antennas having two or more antennas, a transceiver and a processor. The transceiver is configured to transmit via the array of antennas downlink packets to WLAN client stations (STAs) over a downlink channel, and to receive uplink packets from the STAs over an uplink channel. The processor is coupled to the transceiver and is configured to send a request to a plurality of the STAs to transmit on the uplink channel a respective plurality of channel-sounding packets corresponding to the plurality of STAs, to receive the plurality of channel-sounding packets from the plurality of STAs in response to the request, to compute, based on the received plurality of channel-sounding packets, a beamforming matrix that defines subsequent transmission beams aimed toward at least a subset of the plurality of STAs, and to transmit one or more downlink data packets to one or more of the STAs via the array of antennas, in accordance with the beamforming matrix.

In some embodiments, the processor is configured to send the request by sending a trigger frame to the plurality of STAs, the trigger frame causing the plurality of STAs to transmit the channel-sounding packets concurrently. In an embodiment, the processor is configured to compute the beamforming matrix by estimating a plurality of STA-specific channel responses based on the respective plurality of received channel-sounding packets, and by deriving the beamforming matrix from the plurality of STA-specific channel responses.

In some embodiments, the processor is configured to allocate in the request, to each STA in the plurality of STAs, one or more identifiable spatial streams, from among a predefined set of mutually-orthogonal spatial streams, to be used by the respective STAs to transmit the respective channel-sounding packets. In an embodiment, the processor is configured to receive the plurality of channel-sounding packets concurrently, and to segregate between the channel-sounding packets based on an identification of the allocated mutually-orthogonal identifiable spatial streams.

In another embodiment, the processor is configured to apply to the beamforming matrix a calibration that compensates for differences between an uplink response and a downlink response of the transceiver. In yet another embodiment, the processor is configured to specify in the request a minimal number of channel-sounding symbols to be transmitted in the channel-sounding packets.

In a disclosed embodiment, the processor is configured to include, in the plurality of STAs, only STAs whose uplink packets were previously received in the WLAN AP with a signal level that is above a predefined signal-level threshold. Additionally or alternatively, the processor is configured to include, in the plurality of STAs, only STAs whose spatial directions, relative to the array of antennas of the AP, differ from one another in accordance with a predefined spatial criterion.

There is additionally provided, in accordance with an embodiment that is described herein, a method for Wireless Local-Area Network (WLAN) communication, including sending, from a WLAN Access Point (AP) including an array of antennas having two or more antennas, a request to a plurality of WLAN client stations (STAs) to transmit on an uplink channel a respective plurality of channel-sounding packets corresponding to the plurality of STAs. The plurality of channel-sounding packets are received from the plurality of STAs in response to the request. A beamforming matrix, which defines subsequent transmission beams aimed toward at least a subset of the plurality of STAs, is computed based on the received plurality of channel-sounding packets. One or more downlink data packets are transmitted to one or more of the STAs via the array of multiple antennas, in accordance with the beamforming matrix.

There is further provided, in accordance with an embodiment that is described herein, a Wireless Local-Area Network (WLAN) client station (STA) including a transceiver and a processor. The transceiver is configured to receive downlink packets from a WLAN Access Point (AP) over a downlink channel, and to transmit uplink packets to the AP over an uplink channel. The processor is coupled to the transceiver and configured to receive from the AP a request to transmit on the uplink channel a channel-sounding packet, the request specifying one or more identifiable spatial streams, from among a predefined set of mutually-orthogonal spatial streams, and, in response to the request, to generate the channel-sounding packet comprising the specified one or more spatial streams, and to transmit the channel-sounding packet to the AP.

In some embodiments, the processor is configured to receive the request by receiving a trigger frame, and in response to receiving the trigger frame the processor being further configured to transmit the channel-sounding packet concurrently with one or more channel-sounding packets transmitted by one or more additional STAs. In an embodiment, the processor is configured to extract from the request a specified minimal number of channel-sounding symbols to be transmitted in the channel-sounding packet, and to generate the channel-sounding packet with at least the minimal number of channel-sounding symbols.

There is also provided, in accordance with an embodiment that is described herein, a method for Wireless Local-Area Network (WLAN) communication, including, in a WLAN client station (STA), receiving from a WLAN Access Point (AP) a request to transmit on an uplink channel a channel-sounding packet, the request specifying one or more identifiable spatial streams, from among a predefined set of mutually-orthogonal spatial streams. In response to the request, the channel-sounding packet is generated to comprise the specified one or more specified identifiable spatial streams, and the channel-sounding packet is transmitted to the AP.

There is additionally provided, in accordance with an embodiment that is described herein, a Wireless Local-Area Network (WLAN) communication system including a plurality of WLAN client stations (STAs) and an Access Point (AP). The AP is configured to send to the plurality of STAs, via an array of antennas having two or more antennas, a request to transmit on an uplink channel a respective plurality of channel-sounding packets corresponding to the plurality of STAs, to receive the plurality of channel-sounding packets from the plurality of STAs in response to the request, to compute, based on the received plurality of channel-sounding packets, a beamforming matrix that defines subsequent transmission beams aimed toward at least a subset of the plurality of STAs, and to transmit one or more downlink packets to one or more of the STAs via the array of antennas, in accordance with the beamforming matrix.

The present disclosure will be more fully understood from the following detailed description of the embodiments thereof, taken together with the drawings in which:

DETAILED DESCRIPTION OF EMBODIMENTS

In a typical WLAN communication system, an Access Point (AP) communicates with one or more client stations (STAs). In various practical scenarios it is desirable for the AP to transmit beamformed downlink transmissions to multiple STAs concurrently. In order to transmit directional transmissions to multiple STAs, the AP requires knowledge of the channel response (also referred to as Channel State Information—CSI) corresponding to each of the STAs.

Conventional beamforming schemes, including schemes specified in the IEEE 802.11ax draft standard, require each STA to calculate the CSI of its respective channel, and transmit the CSI to the AP. This technique, however, is problematic in many practical cases. For example, when the bandwidth being used is large, when the number of AP antennas is large and/or when the number of STAs is large, the amount of CSI data that needs to be transmitted on the uplink becomes impractical. Moreover, polling of multiple STAs by the AP incurs considerable overhead.

Embodiments that are described herein provide improved methods and apparatus for beamforming in WLAN communication systems. The disclosed techniques do not involve transmitting explicit CSI data from the STAs to the AP, and therefore overcome the above-described challenges.

In some embodiments, the AP selects a plurality of STAs to which it intends to transmit downlink transmissions concurrently. The AP sends a request to the plurality of STAs, requesting them to transmit on the uplink channel a respective plurality of channel-sounding packets. Based on the channel-sounding packets sent (on the uplink) by the plurality of STAs, the AP computes a beamforming matrix (for the downlink) that defines subsequent transmission beams aimed toward at least a subset of the STAs. The AP then generates and transmits downlink data packets to the STAs in the group, in accordance with the beamforming matrix that it computed.

Typically, upon receiving the channel-sounding packets from the STAs, the AP estimates a STA-specific CSI for each STA based on the respective channel-sounding packet. The AP then derives the beamforming matrix from the plurality of STA-specific CSIs.

The process above assumes that, for each STA, the channel responses of the uplink and downlink are similar. In some embodiments the AP applies to the beamforming matrix a calibration that compensates for differences between the uplink and downlink channel responses. Such differences are due, for example, to differences between the responses of the AP transmitter and receiver. The calibration process is discussed in greater detail below.

In an embodiment, the request sent by the AP comprises a trigger frame, and the channel-sounding packets sent by the STAs comprise Null Data Packets (NDPs). Trigger frame formats are specified, for example, in section 9.3.1.22 of the IEEE 802.11ax standard, cited above. The description that follows refers mainly to trigger frames and NDPs, for clarity. The disclosed techniques, however, are in no way limited to any specific packet type or format.

In some embodiments, the trigger frame instructs the STAs in the plurality to transmit their respective NDPs concurrently. In order to segregate between the different received NDPs, the AP allocates to each STA one or more identifiable spatial streams from among a predefined set of mutually-orthogonal spatial streams. Each STA generates its respective NDP using the one or more spatial streams it has been allocated. Using the orthogonality between spatial streams, the AP is able to segregate and decode the multiple concurrently-received NDPs.

As noted above, the disclosed techniques do not require transmission of CSI on the uplink channel. Moreover, in some embodiments the STAs transmit their respective channel-sounding packets concurrently. As such, the disclosed techniques are highly efficient in terms of bandwidth usage, and are also highly scalable in supporting large bandwidths and large numbers of STAs.

In the context of the present disclosure and in the claims, the terms "packet" and "frame" are used interchangeably and refer broadly to various units of information formatted by various communication layers, e.g., the physical (PHY) layer or Medium-Access Control (MAC) layer. Thus, for example, the terms "trigger frame" and "channel-sounding packet" do not mandate or connote an association with any particular communication layer.

Figure 1:
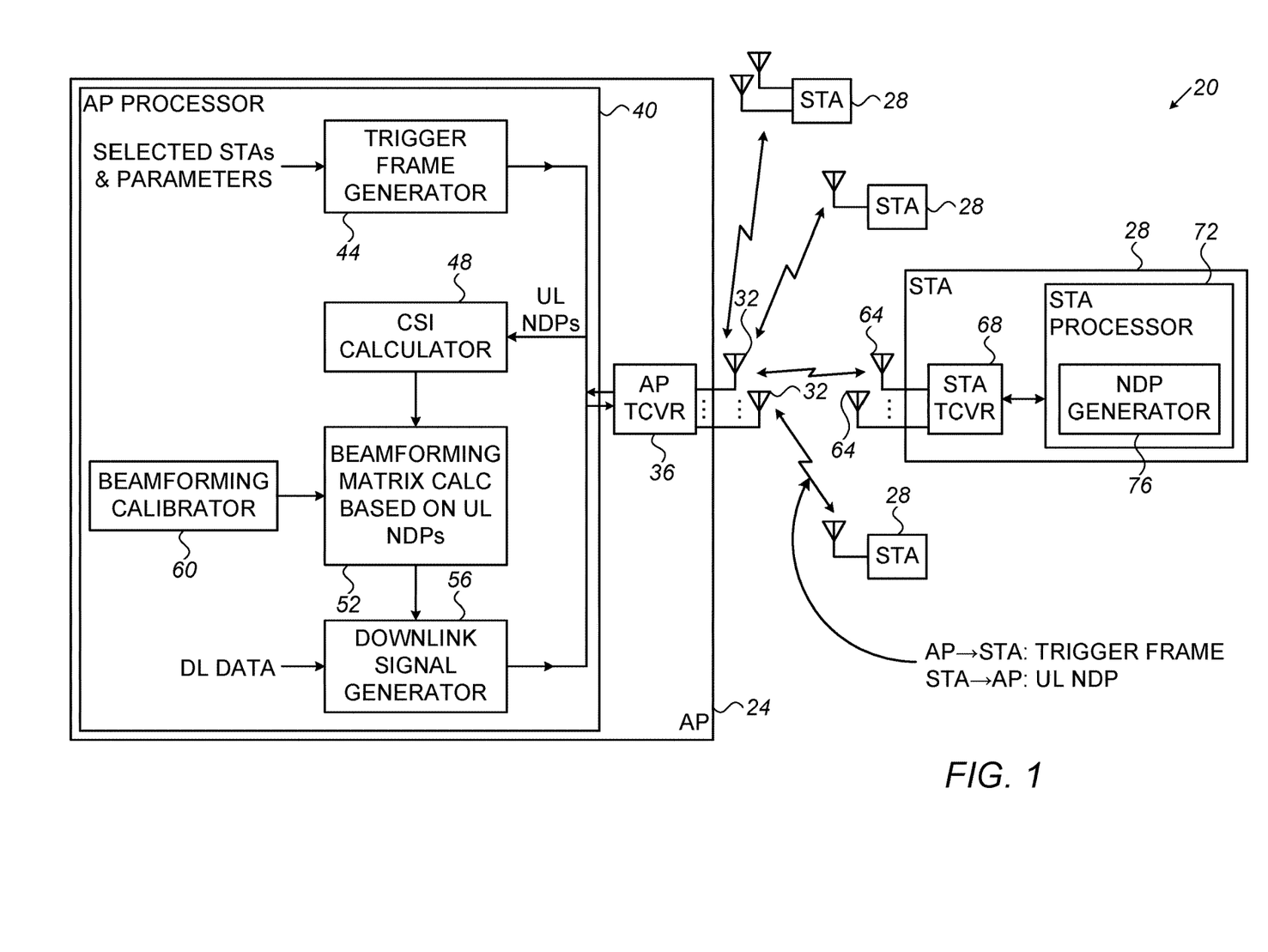
FIG. 1 is a block diagram that schematically illustrates a Wireless Local-Area Network (WLAN) communication system, in accordance with an embodiment that is described herein.

FIG. 1 is a block diagram that schematically illustrates a Wireless Local-Area Network (WLAN) communication system 20, in accordance with an embodiment that is described herein. System 20 comprises an AP 24 and multiple STAs 28. In an embodiment, although not necessarily, AP 24 and STAs 28 operate in accordance with the IEEE 802.11ax standard, cited above. In alternative embodiments, AP 24 and STAs 28 may operate in accordance with any other suitable WLAN standard or protocol, such as IEEE 802.11be or IEEE 802.ac.

In the present example, AP 24 comprises an array of antennas 32. In various embodiments, the array of antennas may comprise any suitable number of antennas, e.g., four, eight or sixteen antennas. Antennas 32 are used for transmission of downlink signals to STAs 28, and for reception of uplink signals from STAs 28. AP 24 further comprises a transceiver (transmitter-receiver) 36 that is configured to transmit the downlink signals and receive the uplink signals. An AP processor 40 carries out the various processing tasks of the AP. Among other functions, AP processor 40 generates beamformed transmission beams, for transmission by transceiver 36 via antennas 32, using techniques that are described in detail below.

In the embodiment of FIG. 1, AP processor 40 comprises a trigger-frame generator 44, a CSI calculator 48, a beamforming matrix calculator 52, a downlink signal generator 56, and a beamforming calibrator 60. Trigger-frame generator 44 is configured to generate trigger frames, including trigger frames that request a selected group of STAs 28 to transmit NDPs on the uplink. CSI calculator 48 is configured to estimate, a respective STA-specific CSI based on the NDP received from each STA in the group. Beamforming matrix calculator 52 is configured to compute, based on the STA-specific CSIs, a downlink beamforming matrix for transmitting concurrently to the STAs in the group. Downlink-signal generator 56 is configured to generate beamformed downlink signals in accordance with the beamforming matrix. Beamforming calibrator 60 is configured to apply a calibration to the beamforming matrix, so as to compensate for differences in channel response (CSI) between the uplink and downlink.

In an embodiment, each STA 28 comprises one or more antennas 64, for reception of downlink signals from AP 24 and for transmission of uplink signals to AP 24. Each STA 28 further comprises a STA transceiver 68 that is configured to transmit the uplink signals and receive the downlink signals. A STA processor 72 carries out the various processing tasks of the STA. Among other functions, STA processor 72 comprises an NDP generator 76 configured to generate uplink NDPs in response to trigger frames received from AP 24. The uplink NDPs are transmitted by transceiver 68 via antennas 64 to AP 24. For the sake of clarity, the detailed internal structure is depicted for only one of STAs 28. Generally, however, the other STAs 28 have a similar structure.

The configurations of system 20, AP 24 and STAs 28 of FIG. 1 are depicted solely by way of example.

In alternative embodiments, any other suitable configurations can be used. The various elements of AP 24 and STAs 28 may be implemented using dedicated hardware or firmware, such as hard-wired or programmable components, e.g., in one or more Application-Specific Integrated Circuits (ASICs), Field-Programmable Gate Arrays (FPGAs) or RF Integrated Circuits (RFICs), using software, or using a combination of hardware and software elements.

In some embodiments, certain elements of AP 24 and/or STAs 28, e.g., certain functions of AP processor 40 and/or STA processor 72, are implemented in one or more programmable processors, which are programmed in software to carry out the functions described herein. The software may be downloaded to the one or more processors in electronic form, over a network, for example, or it may, alternatively or additionally, be provided and/or stored on non-transitory tangible media, such as magnetic, optical, or electronic memory.

Figure 2:
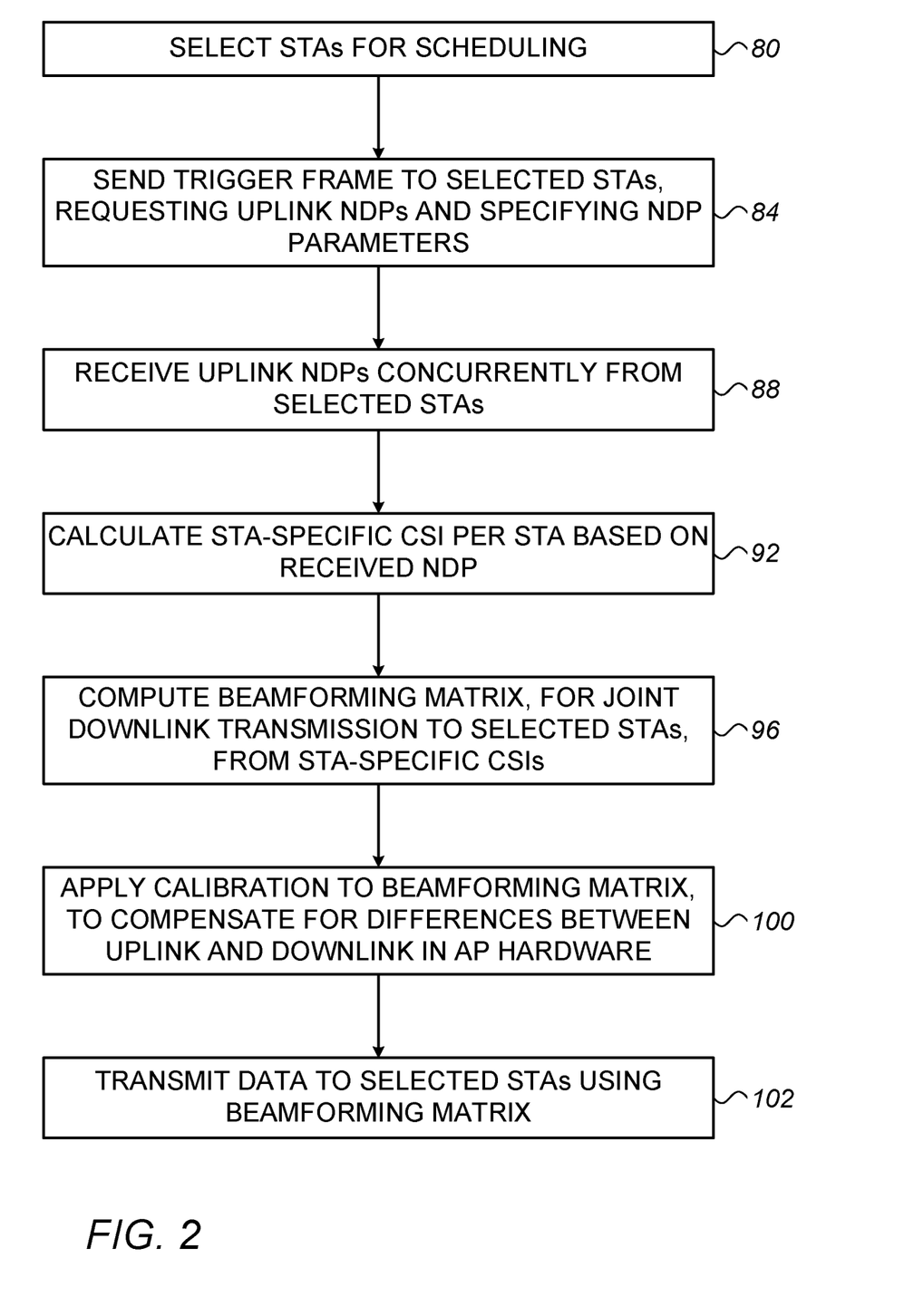
FIG. 2 is a flow chart that schematically illustrates a method for beamforming in the WLAN communication system of FIG. 1, in accordance with an embodiment that is described herein.

FIG. 2 is a flow chart that schematically illustrates a method for beamforming in WLAN communication system 20 of FIG. 1, in accordance with an embodiment that is described herein. The method begins with a selection operation 80, in which AP processor 40 selects two or more STAs 28 for scheduling. In other words, AP processor 40 selects two or more STAs 28 to which it will transmit downlink signals concurrently.

In an embodiment, the downlink signals transmitted by AP transceiver 36 comprise Orthogonal Frequency Domain Multiplexing (OFDM) signals, i.e., sequences of OFDM symbols. Each OFDM symbol comprises multiple modulated sub-carriers having respective frequencies. An OFDM symbols may be divided into multiple Resource Units (RUs), each RU comprising a subset of the sub-carriers.

In an OFDM-based implementation, the term "transmitting downlink signals concurrently to multiple STAs" means "transmitting downlink signals in the same OFDM symbols (or at least in partially overlapping OFDM symbols)." In some cases transmissions to multiple STAs are transmitted in the same RU (a scenario referred to as Multi-User—MU). In other cases transmissions to multiple STAs are transmitted in different RUs in the same OFDM symbol (a scenario referred to as Orthogonal Frequency Domain Multiple Access—OFDMA). Hybrid scenarios that comprise both MU and OFDMA in the same OFDM symbol are also possible. In various embodiments, AP processor 40 may schedule concurrent transmissions to the selected STA using any of the above schemes, i.e., MU and/or OFDMA.

In various embodiments, AP processor 40 may use any suitable criterion for selecting the STAs for concurrent scheduling, and any suitable number of STAs may be selected. In some embodiments, the maximum number of scheduled STAs is eight, in which case the P-matrix specified in the IEEE 802.11ax standard is sufficient. In other embodiments, the maximum number of scheduled STAs is larger than eight, in which case AP processor 40 and STAs 28 support a larger P-matrix. (The P-matrix, specified in section 28.3.10.10 of IEEE 802.11ax, is an orthonormal matrix used for generating mutually-orthogonal and identifiable spatial streams.)

In one example embodiment, AP processor 40 restricts the selection to STAs whose uplink signals are received at AP 24 with at least a predefined Received Signal-Strength Indication (RSSI). In other words, AP processor 40 selects only STAs 28 whose uplink packets were previously received with a signal level that is above a predefined signal-level threshold. The signal-level threshold is typically user-configurable. This technique reduces differences in RSSI among the subsequently-received NDPs, and therefore simplifies Automatic Gain Control (AGC) and improved Analog-to-Digital Conversion (ADC) in AP transceiver 36.

In another example embodiment, AP processor 40 restricts the selection to STAs whose spatial directions relative to the AP antennas are sufficiently different from one another, in accordance with a predefined spatial criterion. For example, AP processor 40 may exclude from the selection STAs that are separated from one another by less than a predefined angular width, relative to AP 24. This criterion helps in reducing interference that might be caused by simultaneous beamformed transmissions from AP 24 to STAs 28 having similar directions.

At a trigger-frame transmission operation 84, trigger-frame generator 44 in AP processor 40 generates a trigger frame, and AP transceiver 36 transmits the trigger frame to the selected STAs. The trigger frame requests the selected STAs to transmit respective NDPs on the uplink. Trigger-frame generator 44 specifies, in suitable fields of the trigger frame, parameters for use by the STAs in generating the respective NDPs.

In an embodiment, the format of the trigger frame follows the format specified in Section 9.3.1.22 of the IEEE 802.11ax standard, cited above and incorporated herein by reference. The trigger frame comprises a "Common Info" field that specifies parameters common to all scheduled STAs, and multiple "User Info" fields specifying STA-specific parameters. The Common Info field and the User Info fields are further divided into subfields. In an embodiment, subfields that are not referred to specifically by the description below retain their specified usage in accordance with the IEEE 802.11ax standard.

In an embodiment, trigger-frame generator specifies the following subfields in the Common Info field of the trigger frame:

Trigger Type subfield: Set to 8 (a reserved value) in the present example, but in alternative embodiments can be set to any other unused value.

BW subfield (specifying the required bandwidth of the uplink NDP): Set to the bandwidth of the downlink packets that the AP intends to transmit to the selected STAs.

GI and LTF Type subfields: Set to the required Guard Interval (GI) and Long Training Field (LTF) type to be transmitted in the uplink NDP.

Number of HE-LTF Symbols subfield: Set to the required number of High Efficiency LTF (HE-LTF) symbols to be transmitted in the uplink NDP.

STBC, Doppler, LDPC Extra Symbol and Packet Extension subfields: Reserved.

The subfields and values listed above are given by way of example. In other embodiments, a different number of subfields, or subfields containing different information, can be specified.

In an embodiment, trigger-frame generator 44 sets the "Number of HE-LTF Symbols" subfield to $$\max_r N_{STS,r,total},$$

wherein $N_{STS,r,total}$ denotes the total number of spatial streams that AP 40 intends to transmit in the RU whose index is r. The number of streams is summed over all the STAs scheduled in RU r. In other words, in this embodiment the "Number of HE-LTF Symbols" subfield is set to the maximal expected number of spatial streams per RU. Note that with this setting, the subsequent uplink NDP will not necessarily perform full-dimensional sounding. In other words, the selected STAs are theoretically capable of receiving a total number of spatial streams per RU that is larger than $$\max_r N_{STS,r,total}.$$

Since, however, the actual number of spatial streams per RU will not exceed $$\max_r N_{STS,r,total},$$

the number of HE-LTF Symbols has no need to exceed $$\max_r N_{STS,r,total}.$$

In an alternative embodiment, trigger-frame generator 44 sets the "Number of HE-LTF Symbols" subfield to $$\max_r N_{STS,r,u}, \; N_{STS,r,u} = N_{rx,r,u},$$

$N_{STS,r,u} = N_{rx,r,u}$, wherein $N_{STS,r,u}$ denotes the number of spatial streams to be transmitted to STA u in RU r, and $N_{rx,r,u}$ denotes the number of antennas of STA u in RU r. These numbers are again summed over all the STAs scheduled in RU r. In other words, in this embodiment the "Number of HE-LTF Symbols" subfield is set to the maximal total number of antennas of all STA scheduled in the same RU, summed per RU. With this setting, the subsequent uplink NDP will perform full-dimensional sounding, regardless of the actual number of spatial streams that the AP intends to transmit. In yet other embodiments, trigger-frame generator 44 may set the "Number of HE-LTF Symbols" subfield to any other suitable value.

In an embodiment, trigger-frame generator 44 specifies the following subfields in the User Info field of the trigger frame, corresponding to a certain selected STA:

AID subfield: Set to the Association Identifier (AID) of the STA.

RU Allocation subfield: Set to the index of the RU, which comprises the sub-carriers that the STA is required to load in the HE-LTFs of the uplink NDP.

SS Allocation subfield: Set to specify one or more Spatial Streams (SS) that the STA is required to use in generating the HE-LTFs of the uplink NDP. The overall pool of spatial streams is represented by a sequence of indices, and the SS allocation subfield specifies (i) a start index (the index of the first spatial stream to be used)) and (ii) the number of spatial streams to be used, starting from the start index. In one example embodiment, for full-dimensional sounding, the number of spatial streams is set to be the number of STA antennas.

As explained above, in some embodiments trigger-frame generator 44 allocates one or more spatial streams to each of the scheduled STAs. The various spatial streams are orthogonal to one another (both within the allocation to a given STA, and between allocations to different STAs). In an example implementation, trigger-frame generator 44 allocates the spatial streams from among a predefined set of mutually-orthogonal spatial streams.

At an NDP reception operation 88, AP transceiver 36 receives the multiple uplink NDPs that were sent by the multiple scheduled STAs 28 in response to the trigger frame. In an embodiment, as explained above, STAs 28 transmit the uplink NDPs concurrently with one another, and each STA generates its respective NDP using the one or more spatial streams it has been allocated. AP processor is configured to segregate and decode the multiple concurrently-received NDPs, using the known orthogonality between spatial streams.

In an embodiment, the format of each uplink NDP is as follows:
- A Legacy Short Training Field (L-STF), followed by a Legacy Long Training Field (L-LTF), followed by a Legacy Signal (L-SIG), then a Repeated Legacy Signal (RL-SIG), a High-Efficiency Signal-A (HE-SIGA), and then a High Efficiency Short Training Field (HE-STF).
- A sequence of High Efficiency Long Training Field (HE-LTF) symbols.

In an embodiment, the number of HE-LTF symbols in the sequence is the number specified in the "Number of HE-LTF Symbols" subfield of the Common Info field of the trigger frame. Each STA 28 generates the HE-LTF symbols using the one or more spatial streams that were allocated to that STA in the trigger frame.

At a CSI calculation operation 92, CSI calculator 48 in AP processor 40 estimates a STA-specific CSI for each of the scheduled STAs 28, based on the uplink NDP received from that STA. For each STA, the STA-specific CSI approximates the channel response of the uplink channel from the STA to AP 24. The description below provides an example process, which is repeated for each STA 28.

In an example embodiment, CSI calculator 48 first removes the polarity of the HE-LTF symbols (i.e., removes the modulation from the HE-LTF symbols, retaining phase and gain information relating to the channel), so as to derive a channel matrix $H_{(nTx\text{-}by\text{-}nSTS)}$, wherein nTx denotes the number of antennas in AP 24, and $$nSTS = \max_r N_{STS,r,total}$$

denotes the number of HE-LTF symbols that was specified in the trigger frame.

The channel matrix $H_{(ntx\text{-}by\text{-}nSTS)}$ gives the channel response of the uplink channel from a given STA 28 to AP 24. CSI calculator 48 then calculates the product $H_{r(nTx\text{-}by\text{-}N_{STS,r,total})} = H_{nTx\text{-}by\text{-}nSTS} \cdot P_{(nSTS\text{-}by\text{-}N_{STS,r,total})}^H$, wherein P denotes the P-matrix defined in the IEEE 802.11ax standard, and $()^H$ denotes the Hermitian transpose (conjugate transpose) operator. The calculation of matrix $H_{r(STS\text{-}by\text{-}N_{STS,r,total})}$ is performed per RU, hence the index r.

CSI calculator 48 now extracts the columns of matrix $H_{r(nTx\text{-}by\text{-}N_{STS,r,total})}$ that correspond to the indices of the spatial streams allocated to the STA whose CSI is being estimated. The relevant indices are specified in the trigger frame, in the "SS Allocation" subfield of the "User Info" field of the STA. The matrix made-up of the extracted columns is denoted $H_{r,u}$, wherein r denotes the RU index, and u denotes the STA index. The dimensions of $H_{r,u}$ are (nTx-by-nSTS,r,u). This matrix gives the uplink CSI for STA u in RU r.

As noted above, CSI calculator 48 repeats the process of calculating the STA-specific CSI per each scheduled STA.

At a beamforming calculation operation 96, beamforming matrix calculator 52 in AP processor 40 computes a downlink beamforming matrix for joint beamformed transmission to the plurality of selected STAs 28. The beamforming matrix is also referred to as a beam-steering matrix or precoding matrix.

Beamforming matrix calculator 52 calculates the beamforming matrix based on the STA-specific CSIs estimated at operation 92 above. In an example embodiment, beamforming matrix calculator 52 first calculates the transpose of each matrix $H_{r,u}$, to produce a respective matrix $H_{r,u,DL}$ that gives the estimated downlink CSI for STA u in RU r. This process is repeated for all STAs in RU r. From the downlink CSIs for all STAs in RU r, beamforming matrix calculator 52 calculates a beamforming matrix $Q_{DL}$ for RU r. The process is typically repeated per sub-carrier in RU r, and then for all RUs.

In the description above, beamforming matrix calculator 52 calculates the beamforming matrix for all STAs 28 in RU r. In alternative embodiments, however, beamforming matrix calculator 52 may include only a subset of the STAs of RU r in the beamforming-matrix calculation. Any suitable criterion can be used for selecting the subset of STAs. In one example, beamforming matrix calculator 52 excludes from the beamforming-matrix calculation the CSIs of STAs whose RSSI is below a predefined threshold. For the STAs excluded from beamforming, in an embodiment, beamforming matrix calculator 52 may use a predefined alternative matrix.

Additionally or alternatively, in some embodiments beamforming matrix calculator 52 excludes one or more RUs from the beamforming-matrix calculation, i.e., calculates the beamforming matrix over only a subset of the RUs.

Further additionally or alternatively, in some embodiments beamforming matrix calculator 52 identifies two (or more) STAs whose direction relative to AP antennas 32 is similar (e.g., which are located within a sector of less than a predefined angular width relative to AP 24). Beamforming matrix calculator 52 performs a combined beamforming calculation for these identified STAs, instead of individually per STA.

At this stage, beamforming matrix calculator 52 has calculated a beamforming matrix for the downlink channels to the selected plurality of STAs 28. Since the calculation is based on uplink CSIs (which were in turn estimated based on uplink channel-sounding packets—NDPs), an underlying assumption is that the downlink and uplink channel responses are the same, within some predefined tolerance. In practice, however, the actual downlink and uplink channel responses sometimes differ from one another, e.g., due to differences in channel response between the AP transmitter circuitry and AP receiver circuitry (in AP transceiver 36).

In some embodiments, in a calibration operation 100, beamforming calibrator 60 in AP processor applies a calibration that compensates for such differences between the uplink and downlink channel responses. Typically, differences between the STA transmitter and receiver do not affect the downlink beamforming matrix, and no calibration is needed at the STAs.

In some embodiments, beamforming calibrator 60 applies the calibration by calculating (or otherwise obtaining) a calibration matrix, and multiplies the calibration matrix by the beamforming matrix $Q_{DL}$. The calibration is typically applied per sub-carrier.

In various embodiments, the calibration matrix can be computed in various ways. In a typical calibration process, AP 24 communicates with an external device, e.g., a dedicated calibration device or a STA. In this communication, AP 24 obtains both uplink CSI and downlink CSI pertaining to the same wireless channel. Beamforming calibrator 60 then calculates the calibration matrix by evaluating the difference between the uplink CSI and the respective downlink CSI. In such a process, differences in the calibration device (STA or otherwise) between downlink and uplink response do not affect the calibration. Moreover, the same calibration is valid for subsequently communicating with any STA.

For example, in an embodiment, beamforming calibrator 60 calculates the difference in phase and magnitude between the uplink and downlink, for each pair of transmit/receive path, and use these differences to calculate the calibration matrix. Examples of calibration techniques that can be used by AP 24 are given, for example, in U.S. Pat. Nos. 9,319, 904, 9,444,577, 9,910,129, 8,774,725 and 8,878,724, whose disclosures are incorporated herein by reference. Alternatively, any other suitable calibration technique can be used.

In various embodiments, beamforming calibrator 60 may calculate a separate calibration matrix per sub-carrier or per group of sub-carriers, per RU or per group of RUs, or a single calibration matrix for all RUs and sub-carriers. In an embodiment, the calibration process is performed off-line, and the calibration matrix (or matrices) stored for later use.

At a downlink transmission operation 102, AP 24 transmits downlink data to the selected STAs concurrently, using the resulting beamforming matrix. Typically, downlink signal generator 56 in AP processor 40 receives data for transmission to the scheduled STAs, formats the data in suitable downlink data packets, generates a beamformed downlink signal using the beamforming matrix, and sends the downlink signal to AP transceiver 36, for transmission via antennas 32.

The method of FIG. 2 is an example method that is depicted solely the sake of conceptual clarity. In alternative embodiments, AP processor 40 may use any other suitable method for carrying out downlink beamforming.

In some embodiments, AP processor 40 repeats the process of calculating the beamforming matrix periodically, in order to track changes in channel response that occur over time. In an example embodiment, AP processor 40 recalculates the beamforming matrix at intervals that are on the order of the coherence time of the channel, e.g., on the order of 8-10 μSec. Other suitable time intervals can also be used.

Although the embodiments described herein mainly address WLAN systems, the methods and systems described herein can also be used in other applications, for example in cellular communication systems such as Long-Term Evolution (LTE) and Fifth-Generation (5G) systems.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A Wireless Local-Area Network (WLAN) Access Point (AP), comprising:
    an array of antennas having two or more antennas;
    a transceiver, configured to transmit via the array of antennas downlink packets to WLAN client stations (STAs) over a downlink channel, and to receive uplink packets from the STAs over an uplink channel; and
    a processor, which is coupled to the transceiver and configured to:
        send a request to a plurality of the STAs to transmit on the uplink channel a respective plurality of channel-sounding packets corresponding to the plurality of STAs, wherein the plurality of STAs transmits the channel-sounding packets concurrently in response to the request;
        receive the plurality of channel-sounding packets from each of the plurality of STAs in response to the request;
        based on the received plurality of channel-sounding packets transmitted by the STAs concurrently, compute a beamforming matrix that defines subsequent transmission beams aimed toward at least a subset of the plurality of STAs; and
        transmit one or more downlink data packets to one or more of the STAs via the array of antennas, in accordance with the beamforming matrix;
    wherein the processor is configured to include, in the plurality of STAs, only STAs whose spatial directions, relative to the array of antennas of the AP, differ from one another in accordance with a predefined spatial criterion, wherein the spatial criterion comprises a predefined angular width.

2. The WLAN AP according to claim 1, wherein the processor is configured to send the request by sending a trigger frame to the plurality of STAs, the trigger frame causing the plurality of STAs to transmit the channel-sounding packets concurrently.

3. The WLAN AP according to claim 1, wherein the processor is configured to compute the beamforming matrix by estimating a plurality of STA-specific channel responses based on the respective plurality of received channel-sounding packets, and by deriving the beamforming matrix from the plurality of STA-specific channel responses.

4. The WLAN AP according to claim 1, wherein the processor is configured to allocate in the request, to each STA in the plurality of STAs, one or more identifiable spatial streams, from among a predefined set of mutually-orthogonal spatial streams, to be used by the respective STAs to transmit the respective channel-sounding packets.

5. The WLAN AP according to claim 4, wherein the processor is configured to receive the plurality of channel-sounding packets concurrently, and to segregate between the channel-sounding packets based on an identification of the allocated mutually-orthogonal identifiable spatial streams.

6. The WLAN AP according to claim 1, wherein the processor is configured to apply to the beamforming matrix a calibration that compensates for differences between an uplink response and a downlink response of the transceiver.

7. The WLAN AP according to claim 1, wherein the processor is configured to specify in the request a minimal number of channel-sounding symbols to be transmitted in the channel-sounding packets.

8. The WLAN AP according to claim 1, wherein the processor is configured to include, in the request to the plurality of STAs, only STAs whose uplink packets were previously received in the WLAN AP with a signal level that is above a predefined signal-level threshold.

9. A method for Wireless Local-Area Network (WLAN) communication, comprising:
    sending, from a WLAN Access Point (AP) comprising an array of antennas having two or more antennas, a request to a plurality of WLAN client stations (STAs) to transmit on an uplink channel a respective plurality of channel-sounding packets corresponding to the plurality of STAs, wherein the plurality of STAs transmits the channel-sounding packets concurrently in response to the request;
    receiving the plurality of channel-sounding packets from each of the plurality of STAs in response to the request;

based on the received plurality of channel-sounding packets transmitted by the STAs concurrently, computing a beamforming matrix that defines subsequent transmission beams aimed toward at least a subset of the plurality of STAs; and transmitting one or more downlink data packets to one or more of the STAs via the array of multiple antennas, in accordance with the beamforming matrix; and including, in the plurality of STAs, only STAs whose spatial directions, relative to the array of antennas of the AP, differ from one another in accordance with a predefined spatial criterion, wherein the spatial criterion comprises a predefined angular width.

10. The method according to claim 9, wherein sending the request comprises sending a trigger frame concurrently to the plurality of STAs, the trigger frame causing the plurality of STAs to transmit the channel-sounding packets concurrently.

11. The method according to claim 9, wherein computing the beamforming matrix comprises estimating a plurality of STA-specific channel responses based on the respective plurality of received channel-sounding packets, and deriving the beamforming matrix from the plurality of channel responses.

12. The method according to claim 9, wherein sending the request comprises allocating in the request, to each STA in the plurality of STAs, one or more identifiable spatial streams, from among a predefined set of mutually-orthogonal spatial streams, to be used by the respective STAs to transmit the respective channel-sounding packets.

13. The method according to claim 12, wherein receiving the plurality of channel-sounding packets comprises receiving the channel-sounding packets concurrently, and segregating between the channel-sounding packets based on an identification of the allocated mutually-orthogonal identifiable spatial streams.

14. The method according to claim 9, further comprises applying to the beamforming matrix a calibration that compensates for differences between an uplink response and a downlink response of the AP.

15. The method according to claim 9, wherein sending the request comprises specifying in the request a minimal number of channel-sounding symbols to be transmitted in the channel-sounding packets.

16. The method according to claim 9, further comprising including, in the request to the plurality of STAs, only STAs whose uplink packets were previously received in the AP with a signal level that is above a predefined signal-level threshold.

* * * * *